United States Patent [19]

Fencil

[11] 4,170,416
[45] Oct. 9, 1979

[54] APPARATUS FOR ANALYZING COHERENT RADIATION

[75] Inventor: Carroll R. Fencil, Fairfield, Conn.

[73] Assignee: The Perkin-Elmer Corporation, Norwalk, Conn.

[21] Appl. No.: 760,165

[22] Filed: Jan. 17, 1977

[51] Int. Cl.² ............................................... G01B 9/02
[52] U.S. Cl. .................................... 356/346; 356/352
[58] Field of Search ................... 356/106 S, 112, 346, 356/352

[56] References Cited

U.S. PATENT DOCUMENTS

| | | | |
|---|---|---|---|
| 3,531,207 | 9/1970 | Lee | 356/112 |
| 3,824,018 | 7/1974 | Crane, Jr. | 356/352 |
| 4,006,356 | 2/1977 | Johnson et al. | 250/203 R |

Primary Examiner—Conrad J. Clark
Attorney, Agent, or Firm—Salvatore A. Giarrantana; Francis L. Masselle; Edwin T. Grimes

[57] ABSTRACT

Apparatus for detecting the presence and/or determining the intensity and/or determining the wavelength and/or determining the threshold direction of coherent radiation in the presence of incoherent ambient radiation.

A preferred form of apparatus includes a Fabry-Perot etalon having three regions of different thickness such that the optical phase difference between the second region and third adjacent region is less than $\pi$ and the optical phase difference between the first and second regions is substantially greater than the optical phase difference between the second and third regions; the etalon having a first surface positioned to receive coherent radiation and a second surface, the average distance between the surfaces being such that the optical path difference between transmitted portions of radiation impinging on the first surface is substantially greater than the coherence length of the coherent radiation; said etalon being modulated with respect to the source of coherent radiation; elements for detecting radiation transmitted through each of the regions and for generating separate first, second and third signals, respectively responsive to the radiation leaving each of the regions, elements for detecting the phase difference between the detected signals, and elements for determining the wavelength of the coherent radiation corresponding to the detected phase differences.

15 Claims, 3 Drawing Figures

APPARATUS FOR ANALYZING COHERENT RADIATION

BACKGROUND OF THE INVENTION

The present invention relates to a Fabry-Perot etalon type interferometer, and more particularly to a two step etalon interferometer. Interferometers constructed in accordance with the concepts of this invention are adapted, among other possible uses, for use in detecting, and determining the wavelength of coherent radiation, as from a laser, in a quantum of radiation including incoherent radiation. It is particularly adapted for discriminating coherent radiation from incoherent radiation, and determining wavelength, from a relatively short continuous wave of the radiation. In addition, it is adapted to determine the relative angular position of the source of the radiation, as well as the intensity thereof.

A Fabry-Perot etalon interferometer consists normally of two plane, parallel partially reflecting surfaces formed on a solid glass spacer so that one portion of incident radiation is transmitted directly through while other portions, being reflected between the partially reflecting surfaces before emerging, are transmitted over a longer path.

As described in U.S. Pat. No. 3,824,018 to R. Crane, a Fabry-Perot etalon is adapted to discriminate coherent radiation by making the optical thickness of the glass spacer sufficiently less (i.e., 1/100 or less) than the absolute coherence length of the incident radiation (i.e., the absolute of the coherence length of the coherent and incoherent incident radiation) so that the absolute coherent length will be substantially less than the difference between the lengths of the paths of the directly and indirectly transmitted radiation (i.e., the optical path difference or OPD). Then, by changing the path length, by means of tilting the etalon, the intensity of the incoherent radiation will remain constant, but the coherent radiation modulates. The intensity of radiation transmitted through the etalon is a function of the OPD and of the wavelength of the radiation. The OPD is a function of the index of refraction of the spacer, of the thickness of the spacer and the angle of refraction of the radiation passing through the interior of the spacer. As the etalon is tilted in a scanning mode at a predetermined rate to vary the optical path lengths, and the OPD, the intensity of the transmitted radiation, suitably detected by a photodetector at the back of the etalon, varies in a manner such that the frequency of the radiation as picked up by the detector decreases and reaches a minimum as the etalon swings through a position at which the angle of incidence of the impinging radiation, and hence, the angle of refraction is zero. By this means the etalon is utilized to detect the relative position of the source of the coherent radiation. Additionally, this etalon may be used to determine the wavelength of the detected coherent radiation at a preselected scan rate by comparing the detected frequency-wavelength pattern with the pattern similarly produced by the coherent radiation whose wavelength is known.

The aforementioned patent also disclosed a one step etalon to, in effect, provide two etalon regions of different thicknesses. As disclosed, the thicknesses differ by a quarter wavelength of the wavelength of the coherent radiation to be detected so that the optical path difference of the two etalon regions differ by a half wavelength. A detector is provided for each of the two etalon portions. The output signals from the two detectors, which are made to be of opposite polarity are added, so that the constant output signal components produced by the incoherent radiation cancel out and the coherent radiation signals are accentuated. Otherwise, the detected output is analyzed in the same manner as described with reference to the single etalon embodiment.

The present contribution to the art is a new and improved etalon interferometer, which is an improvement over such prior devices, as will become apparent as the description proceeds.

SUMMARY OF THE INVENTION

With the foregoing state of the art in view, it is a primary general object of the invention to provide a new and improved apparatus for detecting the presence and/or determining the intensity and/or determining the wavelength and/or determining the threshold direction of coherent radiation in the presence of incoherent ambient radiation.

A more specific object of the invention is to achieve wavelength measurement directly by phase detection, with substantial accuracy and with fewer data samples than heretofore required.

To the accomplishment of the foregoing and other objectives, the invention contemplates in a preferred form thereof, apparatus characterized by a Fabry-Perot etalon having two steps forming three regions of different thickness such that the optical phase difference between the second region and the third adjacent region is less than $\pi$ and the optical phase difference between the first and second regions is substantially greater than the optical phase difference between the second and third regions. The etalon has a first surface positioned to receive coherent radiation and a second surface, the average distance between the surfaces being such that the optical path difference between transmitted portions of radiation impinging on the first surface is substantially greater than the coherence length of the radiation. Provision is made for the etalon to be modulated with respect to the source of coherent radiation. In addition, means are provided for detecting radiation transmitted through each of the regions and for generating separate first, second and third signals, respectively responsive to the radiation leaving each of the regions. Further, means are provided for detecting the phase difference between the detected signals and for determining the wavelength of the coherent radiation corresponding to the detected phase differences.

According to one aspect of the invention, the apparatus includes means for detecting the phase difference between the second and third regions to determine the broad range of desired wavelength, and means for detecting the phase difference between the first and second regions within the broad range detected. Then, the wavelength is determined responsive to the phase difference detected between the first and second regions. Further, means may be provided for subtracting a non-coherent component from the coherent radiation component in said first, second and third signals, respectively.

According to another aspect of the invention, a plane window forms a fourth region and means are provided for detecting radiation transmitted through the fourth region and for generating a fourth signal responsive to the radiation leaving said fourth region. In addition, means are included for subtracting the fourth signal from the second and third signals to produce a signal indicative of the presence of coherent radiation. In combination with the foregoing, a plane window may be provided for forming a fifth region, with means for detecting radiation transmitted therethrough and for generating a fifth signal responsive to the radiation leaving said fifth region. Means are included for filtering out non-coherent radiation components from the fifth signal and for determining the intensity and pulse width of the resultant coherent radiation in a wavelength range corresponding to the preselected detector characteristics.

According to still another feature of the invention, at least one of the means for detecting the radiation transmitted through its corresponding etalon region has four detecting elements disposed in quadrant relationship, and means are provided for determining the threshold direction of the coherent radiation responsive to the relationship of the detected radiation incident on each of said elements.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which the disclosure is based may readily be utilized as a basis for the designing of other apparatus for carrying out the several purposes of the invention. It is important, therefore, that the claims be regarded as including such equivalent apparatus as do not depart from the spirit and scope of the invention.

A specific embodiment of the invention has been chosen for purposes of illustration and description, and is shown in the accompanying drawings, forming a part of the specification.

DETAILED DESCRIPTION OF THE PREFERRED EMBODIMENT

Figure 1:
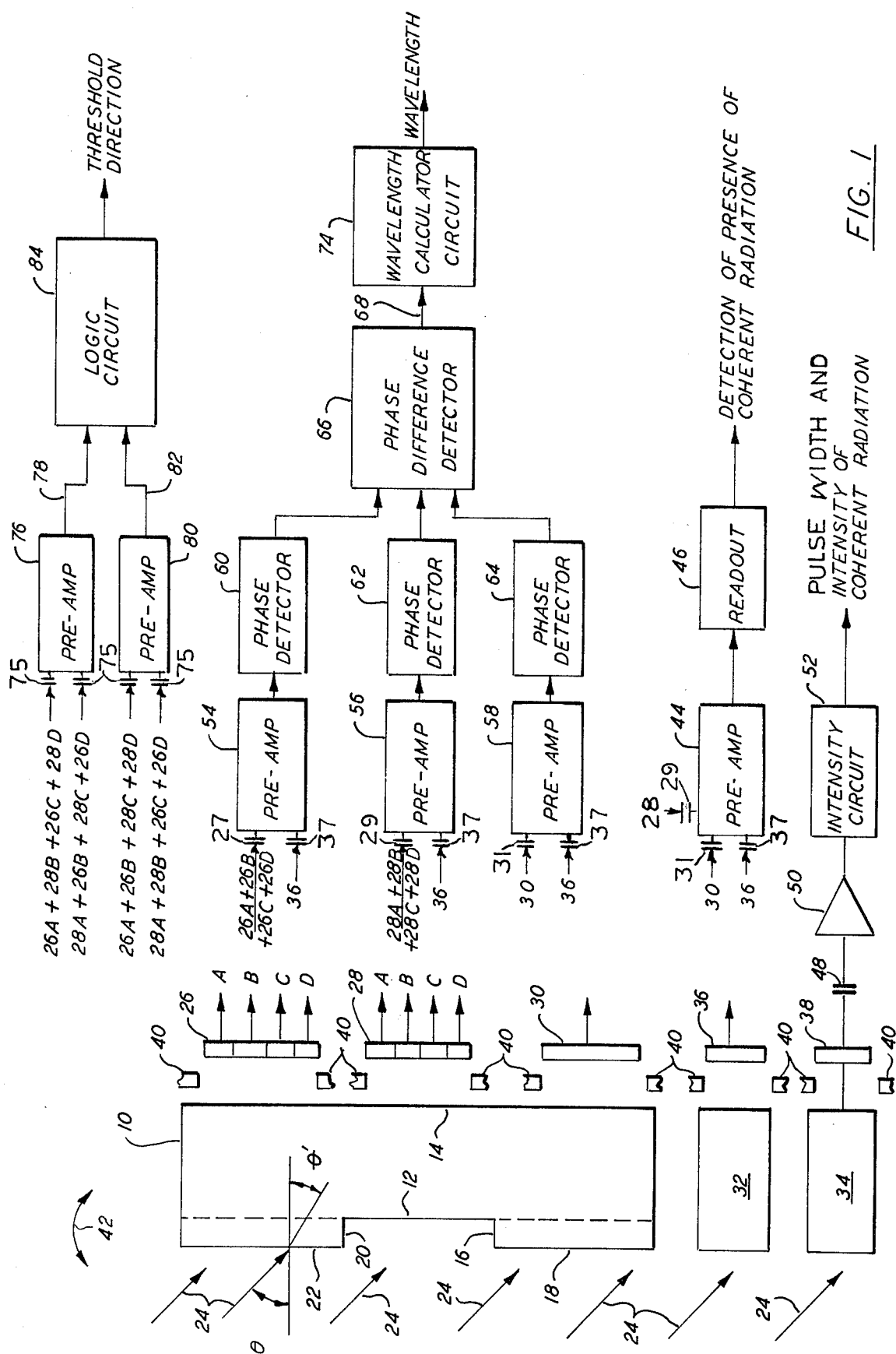
FIG. 1 is a schematic representation illustrating apparatus for analyzing coherent radiation in accordance with the present invention.

In the embodiment of the invention illustrated in the drawings, an optical modulator such as a Fabry-Perot interferometer or etalon is provided which comprises a flat glass spacer 10 having partially reflecting surfaces 12, 14. The thickness of the etalon is not critical, but is determined in general by the particular coherent radiation to be measured, i.e., infrared or visible light range. A preselected thickness depending upon the spectral range is selected to allow lasers to be modulated while still not modulating the background. The etalon 10 is provided with a first step 16 forming a raised surface 18 and a second larger step 20 forming a raised surface 22. The height of the first step 16 may, for example, be of the order of about $\frac{1}{4} \lambda$ at 3 $\mu$m and the height of the second step 20 may, for example, be of the order of about $\frac{1}{4} \lambda$ at 12 $\mu$m. The steps 16 and 20 may, for example, be formed by vacuum depositing germanium on the surface 12 of the etalon when detecting laser beams in the infrared region, or it may comprise aluminum in the visible light region. An incident wave of coherent radiation is indicated by the arrow 24 which may, for example, be disposed at an angle of incidence $\theta$ with respect to the etalon, with the angle of refraction in the etalon being indicated at $\theta'$. Behind the etalon are three photodetectors 26, 28, 30 which correspond to the three surfaces 22, 12, 18 respectively.

Plane windows 32 and 34 are mounted adjacent the etalon 10. Behind window 32 is mounted a pyroelectric detector element 36, and behind the window 34 is an Indium Antimonide detector element 38. Field of view limiting means or baffles 40 serve to restrict the field angle of radiation reaching the surfaces of the detectors 26, 28, 30, 36 and 38.

It will be appreciated that the outputs from the detector elements 26, 28, 30, 36 and 38 are passed through low frequency filters, shown as simple capacitors 27, 29, 31, 37 and 48, respectively, to reduce the low frequency background incoherent signals.

In operation, modulation with respect to the source of coherent radiation is effected by angular movement, as indicated by arrow 42 in FIG. 1, of the entire unit, i.e., by mounting the unit in a moving vehicle, aircraft, or rotating mechanisms. Determination of the presence of coherent radiation is effected by means of applying the output from the detector 28 through capacitor 29, the detector 30 through capacitor 31 and from the detector 36 through capacitor 37 to a pre-amplifier circuit 44, wherein the non-coherent noise as received by the detector 36 is subtracted from the electrical output of the radiation detectors 28 and 30, thereby producing a signal representative of the coherent radiation, with the non-coherent radiation components substantially reduced or eliminated. It is noted that the signals outputted by the detectors 28 and 30 are oscillatory in nature because of the scanning motion of the unit, and hence, to unambiguously determine the presence of coherent radiation the second detector is employed to provide a signal when the first detector passes through its periodic zero reading. The output from the pre-amplifier is fed to an appropriate electrical recorder or further electrical processing circuits, such as frequency discriminators or the like, indicated schematically at 46.

Next, means are provided for determining the intensity and pulse width of the coherent radiation in the 1 to 6 micron wavelength range. This is effected by applying the output from the Indium Antimonide detector element 38 through the capacitor 48 and amplifier 50 to a circuit 52, which outputs a signal indicative of the intensity and pulse width of the coherent radiation on a desired scale of measurement. In addition, the energy output can be determined in the wavelength range of from 2 to 12 microns by processing the signals from the detector 36 in a similar manner.

Figure 3:
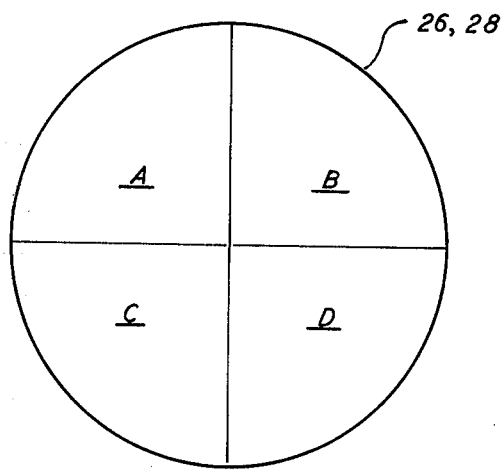
FIG. 3 is a schematic side elevation of a portion of a photodetector according to the invention.

According to the invention, photo-conductive detectors 26, 28 and 30 coact to determine the wavelength of the coherent radiation. It is noted that detectors 26 and 28 are each four element (quadrant) photodiodes, the four elements being indicated at A, B, C and D in FIG. 3. The purpose of this will be discussed more fully hereinafter. For purposes of determining the wavelength of the coherent radiation, the four elements A, B, C, D in each detector are summed. Thus, the outputs from elements 26A, 26B, 26C, and 26D are summed and then applied through the capacitor 27 to a pre-amplifier circuit 54. In addition, the output from the detector 36 is applied through the capacitor 37 to the circuit 54, the capacitor 37 serving to filter out the D.C. components but passing the A.C. components, so that the non-coherent noise as received by the detector 36 is subtracted from the electrical output of the radiation detector 26, thereby producing a signal representative of the coherent radiation passing through the etalon in the region adjacent the detector 26. In a like manner the outputs from the elements 28A, 28B, 28C and 28D are summed and then applied through the capacitor 29 to a pre-amplifier circuit 56 and, in addition, the output from the detector 36 and the capacitor 37 is also applied thereto, so that the non-coherent noise as received by the detector 36 is subtracted from the electrical output of the detector 28, thereby producing a signal representative of the coherent radiation passing through the etalon in the region adjacent the detector 28. The detector 30 is a single element photodiode and the output thereof is applied through the capacitor 31 to a pre-amplifier circuit 58. In addition, the output from the detector 36 is also applied through capacitor 37 to this circuit to subtract the non-coherent noise from the electrical output of the detector 30, thereby producing a signal representative of the coherent radiation passing through the etalon in the region adjacent the detector 30. The outputs from the pre-amplifier circuits 54, 56 and 58 are fed to phase detection circuits 60, 62 and 64, respectively, which output signals corresponding to the zero crossover points of the waves with respect to a D.C.=0 base line of the signals from the photodetectors 26, 28 and 30 respectively. The output signals from the phase detection circuits are then fed to a phase difference detector 66 which, in turn, produces a signal indicative of the optical phase difference $\phi$. That is, the phase difference between the detectors 28 and 30 indicates the broad band or range and the phase difference between detectors 26 and 28 indicates the fine tune phase difference $\phi$ within the broad range, which is then outputted at 68, as will be disccused more fully hereinafter.

Figure 2:
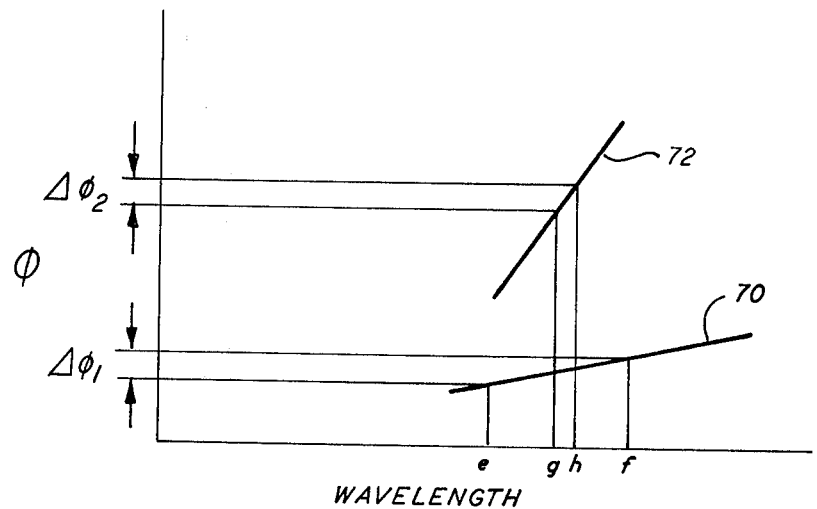
FIG. 2 is a graphical representation of the relationship of the wavelength and optical phase difference.

It is noted that the signals outputted by the detectors 26, 28 and 30 are oscillatory in nature because of the scanning motion of the unit, as indicated by the arrow 42 in FIG. 1, due to the angular movement of the vehicle or aircraft on which the unit is mounted. In order to determine $\phi$ and hence the wavelength with a reasonable degree of accuracy, an etalon with two steps and three surfaces is employed. The height of the first step 16 is selected low enough (such as about $\frac{1}{4} \lambda$ at 3 $\mu$m., for example) so that the cycle never repeats itself, i.e., $\phi$ is less than $\pi$. This allows the wavelength to be determined unambiguously. However, because the step is low, the relationship between $\phi$ and the wavelength is rather flat as indicated by line 70 in FIG. 2 and, as a result, the error as a practical matter in determining $\phi$ (indicated by $\Delta \phi_1$ in FIG. 2) indicates that the wavelength is between e and f. In order to more accurately determine $\phi$ a second step 20 is employed which is substantially higher than the first step 16 (the second step being $\frac{1}{4} \lambda$ at 12 $\mu$m., for example), and hence, provides a substantially steeper relationship between $\phi$ and the wavelength, as indicated by line 72 in FIG. 2. The error in determining $\phi$ in this case is substantially smaller. That is, $\Delta \phi_2$ indicates that the wavelength is in a narrow range, i.e., between g and h in this case. It is noted that the wavelength could not be determined unambiguously by using the higher step 20 alone, because $\phi$ would be greater than $\pi$ and hence the cycle repeats itself and for a single value of $\phi$ there would be several possible ranges of values of wavelength.

The wavelength is determined directly from the following formula:

$$\lambda = (4ns/\phi) \cos \theta$$

where
 $\lambda$ is the wavelength
 n is the index of the etalon
 s is the height of the step
 $\theta'$ is the angle of refraction in the etalon
 $\phi$ is the optical phase difference It is noted that the angle of refraction $\theta'$ in the etalon is a very small angle and, hence, the cosine of $\theta'$ is very nearly unity. The cosine term can be set equal to unity for most all calculations. However, the error can be further reduced by using an average value for cosine $\theta'$, if desired.

The terms n and s are constants for a given system and, as a consequence, the wavelength $\lambda$ can be determined from the optical phase difference $\phi$. This can be manually calculated or it can be automatically determined by an electrical circuit, indicated at 74 in FIG. 1.

In combination with the means for determining the wavelength of the coherent incident radiation, means are provided for determining the relative angular position or threshold direction of the coherent source of the radiation in the presence of incoherent radiation. As pointed out hereinbefore, detectors 26 and 28 each consist of four (quandrant) elements, as shown at A, B, C and D in FIG. 3. The field of view limiting means or baffles 40 restrict the field angle of the radiation reaching the surfaces of the various elements of each detector. The relationship of the intensities of the radiation reaching the various detectors determines the angle of incidence of the radiation. For determining the component of the threshold direction on the X-axis, the outputs from elements 26A, 28B, 26C and 28D are summed and inputted through a capacitor 75 to a pre-amplifier 76, while the outputs from the elements 28A, 26B, 28C and 26D are summed and applied through a second capacitor 75 to the pre-amplifier 76, wherein the sum of the second mentioned group are subtracted from the sum of the first group to thereby output a signal at 78 corresponding to the component on the X-axis. For determining the component of the threshold direction on the Y-axis, the outputs from the elements 26A, 26B, 28C and 28D are summed and applied through a third capacitor 75 to a pre-amplifier 80, while the outputs from the elements 28A, 28B, 26C and 26D are summed and also applied through a fourth capacitor 75 to the pre-amplifier 80, wherein the second mentioned group are subtracted from the sum of the first group to thereby output a signal at 82 corresponding to the component on the Y-axis. The outputs 78 and 82 from the pre-amplifiers are applied to a logic circuit 84, which outputs a signal indicative of the threshold direction on a desired scale of measurement.

It will thus be seen that the present invention does indeed provide new and improved apparatus for detecting, determining the intensity, determining the wavelength and determining the threshold direction of coherent radiation in the presence of incoherent ambient radiation. Having thus described the invention with particular reference to the preferred forms thereof, it will be obvious to those skilled in the art to which the invention pertains, after understanding the invention that various changes and modifications may be made therein without departing from the spirit and scope of the invention, as defined by the claims appended hereto.

What is claimed is:

1. Apparatus for determining the wavelength of coherent radiation in a range of wavelengths to be monitored in the presence of incoherent ambient radiation comprising:

a Fabry-Perot etalon having three regions of different preselected thicknesses corresponding to said range of wavelengths such that the optical phase difference between the second region and third adjacent region is less than $\pi$ for any given wavelength in said range and the optical phase difference between the first and second regions is substantially greater than the optical phase difference between the second and third regions;

said etalon having a first surface positioned to receive coherent radiation and a second surface, the average distance between said surfaces being such that the optical path difference between transmitted portions of radiation impinging on said first surface is substantially greater than the coherence length of the noncoherent radiation but substantially less than the coherence length of the coherent radiation;

means for modulating said etalon with respect to a source of coherent radiation;

means for detecting radiation transmitted through each of said regions and for generating separate first, second and third signals, respectively responsive to the radiation leaving each of said regions;

means for detecting the phase difference between the signals detected from the second and third regions to determine the broad range of desired wavelength, and means for detecting the phase difference between the signals detected from the first and second regions within the broad range detected; and means for determining the wavelength of the coherent radiation corresponding to the detected phase differences.

2. Apparatus according to claim 1 further comprising means for detecting the presence of coherent radiation.

3. Apparatus according to claim 1 further comprising means for determining the intensity of coherent radiation.

4. Apparatus according to claim 1 further comprising means for determining the threshold direction of coherent radiation.

5. Apparatus according to claim 1 further comprising means for subtracting a non-coherent radiation component from the coherent radiation component in said first, second and third signals, respectively.

6. Apparatus according to claim 5 wherein said means for subtracting non-coherent radiation comprises;

a plane window forming a fourth region;

means for detecting radiation transmitted through said fourth region and generating a fourth signal responsive to the radiation leaving said fourth region; and means for subtracting said fourth signal from said first, second and third signals, respectively.

7. Apparatus according to claim 6 further comprising low frequency filters for reducing the low frequency background incoherent signals from the output of each of said means for detecting radiation, respectively.

8. Apparatus according to claim 6 further comprising means for subtracting said fourth signal from said second and third signals to produce a signal indicative of the presence of coherent radiation.

9. Apparatus according to claim 8 further comprising:

a plane window forming a fifth region;

means for detecting radiation transmitted through said fifth region and for generating a fifth signal responsive to the radiation leaving said fifth region; and means for filtering out the non-coherent radiation component from said fifth signal and for determining the pulse width and intensity of the resultant coherent radiation in a wavelength range corresponding to preselected characteristics of said means for detecting radiation transmitted through said fifth region.

10. Apparatus according to claim 1 wherein at least one of said means for detecting the radiation transmitted through its corresponding region has four detecting elements disposed in quadrant relationship, and means for determining the threshold direction of the coherent radiation responsive to the relationship of the detected radiation incident on each of said elements.

11. Apparatus according to claim 1 wherein said means for detecting the radiation transmitted through said first region has four detecting elements disposed in quadrant relationship, and wherein said means for detecting the radiation transmitted through said second region has four detecting elements disposed in quadrant relationship, and means for determining the threshold direction of the coherent radiation responsive to the relationship of the detected radiation incident on each of said elements.

12. Apparatus according to claim 1 further comprising:

a plane window forming a fourth region;

means for detecting radiation transmitted through said fourth region and generating a fourth signal responsive to the radiation leaving said fourth region;

means for subtracting said fourth signal from said first signal and for detecting the phase of the resultant coherent radiation of the first region;

means for subtracting said fourth signal from said second signal and for detecting the phase of the resultant coherent radiation of the second region;

means for subtracting said fourth signal from said third signal and for detecting the phase of the resultant coherent radiation of the third region;

means for detecting the phase difference between the second and third regions to determine the broad range of desired wavelength and means for detecting the phase difference between the first and second regions within the broad range detected; and means for determining the wavelength of the coherent radiation responsive to the phase difference detected between the first and second regions.

13. Apparatus for detecting the presence and determining the threshold direction of coherent radiation in the presence of incoherent ambient radiation comprising:

a Fabry-Perot etalon having two regions of different thickness such that there is an optical phase difference therebetween;

said etalon having a first surface positioned to receive coherent radiation and a second surface, the average distance between said surfaces being such that the optical path difference between transmitted portions of radiation impinging on said first surface is substantially greater than the coherence length of the incoherent radiation; but substantially less than the coherence length of the coherent radiation means for modulating said etalon with respect to a source of coherent radiation;

a first plane window;

a second plane window;

means for detecting radiation transmitted through said etalon regions and through each of said windows, and generating separate first, second, third and fourth signals responsive to the radiation leaving said etalon regions and windows, respectively;

means for subtracting said third signal from said first and second signals to produce an output signal indicative of the presence of coherent radiation; and means for filtering out the non-coherent radiation from said fourth signal and for determining the intensity of the resultant coherent radiation in a wavelength range corresponding to preselected characteristics of said means for detecting radiation transmitted through said second window.

14. Apparatus according to claim 13 wherein said means for detecting the radiation transmitted through said etalon has four detecting elements disposed in quadrant relationship, and means for determining the threshold direction of the coherent radiation responsive to the relationship of the detected radiation incident on each of said elements.

15. Apparatus for detecting the presence, determining the intensity, determining the wavelength in a range of wavelengths to be monitored and determining the threshold direction of coherent radiation in the presence of incoherent ambient radiation comprising, in combination:

a Fabry-Perot etalon having three regions of different preselected thicknesses corresponding to said range of wavelengths such that the optical phase difference between the second region and third adjacent region is less than $\pi$ for any given wavelength in said range and the optical phase difference between the first and second regions is substantially greater than the optical phase difference between the second and third regions;

said etalon having a first surface positioned to receive coherent radiation and a second surface, the average distance between said surfaces being such that the optical path differences between transmitted portions of radiation impinging on said first surface is substantially greater than the coherence length of the incoherent radiation, but substantially less than the coherence length of the coherent radiation means for modulating said etalon with respect to a source of coherent radiation;

a plane window forming a fourth region;

a plane window forming a fifth region;

means for detecting radiation transmitted through each of said regions and for generating separate first, second, third, fourth and fifth signals, respectively responsive to the radiation leaving each of said regions;

means for subtracting said fourth signal from said second and third signals to produce an output signal indicative of the presence of coherent radiation;

means for filtering out the non-coherent radiation from said fifth signal and for determining the pulse width and intensity of the resultant coherent radiation in a wavelength range corresponding to preselected characteristics of said means for detecting radiation transmitted through said fifth region;

means for subtracting said fourth signal from said first signal and for detecting the phase of the resultant coherent radiation of the first region;

means for subtracting said fourth signal from said second signal and for detecting the phase of the resultant coherent radiation of the second region;

means for subtracting said fourth signal from said third signal and for detecting the phase of the resultant coherent radiation of the third region;

means for detecting the phase difference between the second and third regions to determine the broad range of desired wavelength, and means for detecting the phase difference between the first and second regions within the broad range detected;

means for determining the wavelength of the coherent radiation responsive to the phase difference detected between the first and second regions;

said means for detecting the radiation transmitted through said first region having four detecting elements disposed in quadrant relationship;

said means for detecting the radiation transmitted through the second region having four detecting elements disposed in quadrant relationship;

means for detecting radiation incident on each of said elements; and means for determining the threshold direction of the coherent radiation responsive to the relationship of the detected radiation incident on each of said elements.

* * * * *